Jan. 29, 1929.

F. R. STELZENMULLER 1,700,654

BORING TOOL

Filed Dec. 7, 1927

WITNESSES

INVENTOR
Fred R. Stelzenmuller
BY
ATTORNEY

Patented Jan. 29, 1929.

1,700,654

UNITED STATES PATENT OFFICE.

FRED R. STELZENMULLER, OF DELAWANNA, NEW JERSEY.

BORING TOOL.

Application filed December 7, 1927. Serial No. 238,378.

The present invention is concerned with a boring tool primarily designed for boring square or other rectangular holes.

An object of the invention is to provide a boring tool in which an auger bit is associated with a pair of milling cutters, the bit and cutters being simultaneously driven in such a manner that the cutters rotate in the same direction, and following the bit into work to be drilled produce a substantially square or other rectangular cut. The axis of rotation of the milling cutters is of course at right angles to the axis of rotation of the auger bit.

Other objects of the invention are to provide a tool of this character which will drill a square or rectangular opening, leaving only a pair of extremely small fillets to be removed by hand.

Another object of the invention is to provide a tool of this character of extremely simple, practical construction, which will be rugged, durable and efficient in use, and well suited to the requirements of economical manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
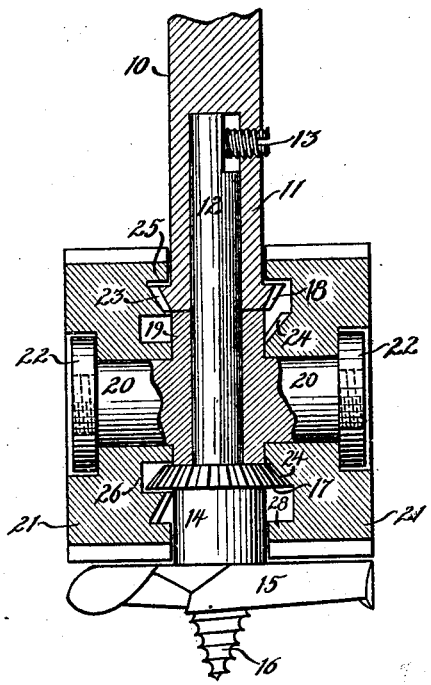
Fig. 1 is a longitudinal sectional view through my improved tool.

In the drawings I have used the reference numeral 10 to designate the stock of an auger bit adapted to be secured in a brace or rotated in any other desired manner. This stock at its lower end is provided with a pocket 11 receiving a shaft 12, the shaft being held against rotation in the socket by a set screw 13.

Mounted on the lower end of the shaft 12 is a hub 14 carrying an auger bit 15 provided with the usual threaded entering point 16.

Immediately above the hub 14 and preferably fixed thereto, or to the shaft 12 is a bevelled gear 17. Another bevelled gear 18 is integral or rigid with the lower end of the stock 10.

A sleeve 19 encircles the shaft 12 between the gears 17 and 18, this sleeve being provided on opposite sides with radially projecting spindles 20 upon which milling cutters 21 are secured by nuts 22 or in any other appropriate manner.

The inner faces of the milling cutters 21 are formed with internal bevelled gears 23 and 24 respectively meshing with the gears 18 and 19 respectively. It will be noted that the left hand cutter of Fig. 1 at its periphery extends substantially to the surface of the hub 14 and stock 10, being internally cut away at 25 defining an annular groove into which the gear 18 projects for engagement with the gear teeth 23. This cutter is also annularly grooved at 26 nearer its center to accommodate the gear 17 in mesh with the right hand cutter.

The right hand cutter of Fig. 1 is annularly grooved at 28 to provide clearance for the gear 18, and the teeth 24 are formed on one of the sloping walls of this groove.

Figure 2:
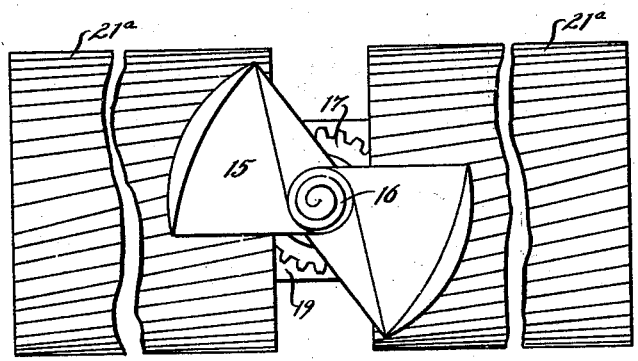
Fig. 2 is a bottom plan view thereof showing longer milling cutters substituted for those of Fig. 1.
Figure 3:
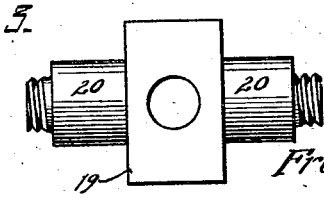
Fig. 3 is a plan view of the sleeve and spindles.

The milling cutters of Fig. 1 are of such a size that the tool will bore a square hole while the cutters 21$^a$ of Fig. 2 are elongated and are adapted for cutting a relatively long rectangular hole.

In operation, the stock 10 may be rotated in any desired manner, the sharp threaded entering point 16 of the auger bit is entered into the edge of a bore or any other suitable piece of work in which a hole is to be drilled. The auger bit 15 will follow the pointed end 16 into the wood, drilling a circular hole, the diameter of which is equal to the length of a side of the proposed square opening. Following the auger bit, milling cutters 21 rotating each in the same direction serve to mortise or bore a square opening.

In the case of Fig. 2 the diameter of the hole cut by the auger bit 15 is equal to the shorter dimension of the elongated rectangular opening made by the milling cutters. In either event, there will only be four very small fillets left due to the fact that the arrangement of internal gearing permits the cutters 21 to be brought substantially against the shaft 11 and hub 14.

It will be noted that in Fig. 1, the gear ratio is such that the right hand cutter will rotate at a greater speed than the left hand cutter. Obviously, the two cutters might be made to rotate at the same speed by simply enlarging the gear 18 and deepening the grooves 25 and 28.

Various slight changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A boring tool of the class described including a shaft, an auger bit mounted thereon, a sleeve on the shaft, spindles projecting laterally from the sleeve, milling cutters on the spindles, and means operable from the shaft for rotating the cutters in the same direction.

2. A boring tool of the class described including a shaft, an auger bit mounted thereon, a sleeve on the shaft, spindles projecting laterally from the sleeve, milling cutters on the spindles, and means operable from the shaft for rotating the cutters in the same direction, said means comprising internal bevel gears on the inner faces of the cutters meshing with bevel gears on the shaft.

3. A boring tool of the class described including a shaft, an auger bit mounted thereon, a sleeve on the shaft, spindles projecting laterally from the sleeve, milling cutters on the spindles, and means operable from the shaft for rotating the cutters in the same direction, said means comprising internal bevel gears on the inner faces of the cutters meshing with bevel gears on the shaft, the inner faces of each cutter being annularly grooved to provide clearance for the driving gear of the other cutter.

4. A boring tool of the class described including a shaft, an auger bit mounted thereon, a sleeve on the shaft, spindles projecting laterally from the sleeve, milling cutters on the spindles, and means operable from the shaft for rotating the cutters in the same direction, said means comprising internal bevel gears on the inner faces of the cutters meshing with bevel gears on the shaft, the bevel gears of the cutters being integral therewith and disposed in grooves in the inner faces of the cutters.

5. A boring tool of the class described including a shaft, an auger bit mounted thereon, a sleeve on the shaft, spindles projecting laterally from the sleeve, milling cutters on the spindles, and means operable from the shaft for rotating the cutters in the same direction, said means comprising internal bevel gears on the inner faces of the cutters meshing with bevel gears on the shaft, the bevel gears of the cutters being integral therewith and disposed in grooves in the inner faces of the cutters, the peripheral edges of the cutters projecting inwardly and housing said gears.

6. A boring tool of the class described including a shaft, an auger bit mounted thereon, a sleeve on the shaft, spindles projecting laterally from the sleeve, milling cutters on the spindles, and means operable from the shaft for rotating the cutters in the same direction, said sleeve being square sided to provide bearing surfaces for the inner ends of the cutters.

Signed at Lyndhurst in the county of Bergen and State of New Jersey this 5th day of December A. D. nineteen hundred and twenty-seven.

FRED R. STELZENMULLER.